United States Patent
Green et al.

(10) Patent No.: US 12,208,551 B2
(45) Date of Patent: Jan. 28, 2025

(54) METHODS OF IN-MOLDING LABELS AND DISPENSERS THEREOF

(71) Applicant: Kimberly-Clark Worldwide, Inc., Neenah, WI (US)

(72) Inventors: Jonathan Green, Russett (GB); Klemen Erzen, Preddvor (SI); Joseph E. Oberdorf, Leiden (NL)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 18/006,777

(22) PCT Filed: Aug. 31, 2020

(86) PCT No.: PCT/US2020/048769
§ 371 (c)(1),
(2) Date: Jan. 25, 2023

(87) PCT Pub. No.: WO2022/046110
PCT Pub. Date: Mar. 3, 2022

(65) Prior Publication Data
US 2023/0264398 A1    Aug. 24, 2023

(51) Int. Cl.
*B29C 45/14* (2006.01)
*B29C 45/16* (2006.01)
(Continued)

(52) U.S. Cl.
CPC .... *B29C 45/1671* (2013.01); *B29C 45/14688* (2013.01); *G09F 13/0413* (2013.01);
(Continued)

(58) Field of Classification Search
CPC . G09F 23/00; G09F 13/0413; B29C 45/1671; B29C 45/14688;
(Continued)

(56) References Cited

U.S. PATENT DOCUMENTS 7,568,593 B2    8/2009  Cittadino et al.
8,048,363 B2   11/2011  Schlaupitz et al.
(Continued)

FOREIGN PATENT DOCUMENTS

EP         2213580         8/2010
WO    WO2005084737 A1    9/2005
(Continued)

OTHER PUBLICATIONS

Knights, In-Mold Assembly: The New Frontier for Multi-Shot Molding, Plastics Technology, 2007, 8 pages.
(Continued)

*Primary Examiner* — Monica A Huson
(74) *Attorney, Agent, or Firm* — Dority & Manning, P.A.

(57) ABSTRACT

Methods for producing a dispenser for dispensable products are disclosed. The method includes attaching a label to the front plate of the dispenser by an in-mold process. The label has a label height (H2) that is less than the front plate height (H1) and label width (W2) that is less than the front plate width (W1) such that a border is formed around at least a portion of the label in the front plate. The front plate can be formed from a transparent material while the label is formed from an opaque material.

18 Claims, 8 Drawing Sheets

(51) Int. Cl.
*G09F 13/04* (2006.01)
*G09F 23/00* (2006.01)

(52) U.S. Cl.
CPC .... *G09F 23/00* (2013.01); *B29C 2045/14918* (2013.01); *B29K 2995/0025* (2013.01); *B29K 2995/0026* (2013.01)

(58) Field of Classification Search
CPC .. B29C 2045/14918; B29K 2995/0026; B29K 2995/0025; A47K 2010/3233
See application file for complete search history.

(56) References Cited

U.S. PATENT DOCUMENTS

| | | |
|---|---|---|
| 8,240,935 B2 | 8/2012 | Yuhas |
| 8,459,498 B2 | 6/2013 | Giraud |
| 8,464,898 B2 | 6/2013 | Giraud |
| 10,335,815 B2 | 7/2019 | Bruder |
| 2008/0122137 A1 | 5/2008 | Hamaoka |
| 2008/0206510 A1* | 8/2008 | Huang ................ B29C 45/1671 264/445 |
| 2009/0038888 A1 | 2/2009 | Eisenbacher |
| 2009/0277920 A1 | 11/2009 | Cittadino et al. |
| 2011/0101030 A1 | 5/2011 | Csaba et al. |
| 2014/0048973 A1 | 2/2014 | Gustavsson et al. |
| 2014/0124246 A1 | 5/2014 | Seki |

FOREIGN PATENT DOCUMENTS

| | | |
|---|---|---|
| WO | WO2016001882 | 1/2016 |
| WO | WO2019011649 A1 | 1/2019 |

OTHER PUBLICATIONS

International Search Report and Written Opinion for PCT/US2020/048769, dated Nov. 17, 2020, 7 pages.
European Search Report Corresponding to Application No. 20951813.3 on Aug, 1, 2024.

* cited by examiner

METHODS OF IN-MOLDING LABELS AND DISPENSERS THEREOF

RELATED APPLICATIONS

The present application is the national stage entry of International Patent Application No. PCT/US2020/048769 having a filing date of Aug. 31, 2020 which is incorporated herein in its entirety by reference thereto.

BACKGROUND

Washrooms in commercial and residential buildings typically include products such as toilet tissue, paper towels, diapers, feminine products, liquid products such as soap, and aerosol products such as air fresheners. These products are typically housed by a dispenser and are dispensed as needed by the user. Those skilled in the art have spent considerable time designing smart dispensers that are intended to overcome the problems noted above. For instance, dispensers have been designed that can monitor product usage and product levels in order to prevent waste. In addition, electronic towel dispensers have been designed that automatically dispense a metered length of towel material upon sensing the presence of a user. This type of dispenser has become known in the art as a "hands-free" dispenser in that it is not necessary for the user to manually activate or otherwise handle the dispenser to initiate a dispense cycle. The control systems and mechanical aspects of hands-free dispensers are wide and varied.

Problems still remain, however, in incorporating different functionalities into a standard dispenser. For example, the capability of modifying a dispenser for a particular application and/or for a particular customer is limited. For example, a need exists for a system and method for modifying an existing dispenser so that the dispenser will have an appearance desired by an end user and/or a functionality desired by an end user. One problem associated with modifying the appearance of the dispenser is that multiple parts must be created and assembled in order to provide a dispenser having a varied appearance in comparison to other more plain or rudimentary dispensers. Manufacturing multiple parts and assemble said parts can be expensing and time consuming. Further, dispensers manufactured with several parts can create dirt traps between the parts, thus disrupting the hygienic condition of the dispenser.

In view of the above, a need exists for a method of forming a dispenser and overall dispenser design that allows for more improved dispenser design control and/or for incorporating different aesthetics and functionality into a dispenser.

SUMMARY

In general, the present disclosure is directed to a method for forming a dispenser for dispensing a dispensable product. The method includes forming a front cover assembly for a dispenser. The method includes positioning a label in a mold, the label having a label height (L2) and label width (W2); injecting a first material into the mold to form a front plate, the front plate having a front plate height (H1) that is greater than the label height (H2) and a front plate width (W1) that is greater than the label width (W2) such that a border is formed around at least a portion of the label in the front plate; and injecting a second material into the mold to form one or more sidewalls, a top wall, a bottom wall, or combinations thereof of the front cover assembly.

In another embodiment, the method includes positioning a label in a first mold, the label having a label height (H2) and label length (W2); injecting a first material into the first mold to form a front plate with in-mold label, the front plate having a front plate height (H1) that is greater than the label height (H2) and a front plate width (W1) that is greater than the label width (W2) such that a border is formed around at least a portion of the label in the front plate; cooling the front plate with in-mold label; ejecting the front plate with in-mold label from the first mold; transferring the front plate with label to a second mold; and injecting a second material into the second mold to form one or more sidewalls, a top wall, a bottom wall, or combinations thereof of the front cover assembly.

The label can further include one or more logos thereon. In embodiments, the front plate can be formed from a transparent material and the label is formed from an opaque material. One or more light emitting devices can be disposed in the dispenser to light the border. In other embodiments, the border can be modified to change the appearance of the border.

In one embodiment, the one or more sidewalls, top wall, and/or bottom wall can be formed from a different material as compared to the front plate. For example, the front plate can be formed from a transparent material and the walls can be formed from an opaque material. In other embodiments, the walls can be formed form the same material used to form the front plate.

In other embodiments, the method includes attaching the front cover assembly to a back cover. The back cover comprising a first side and a second and opposite side. The second and opposite side configured to be mounted to a mounting surface. A housing having an interior volume so as to retain a dispensable product is formed between the front cover assembly and the back cover.

The method can include disposing a dispensing mechanism within the housing for dispensing the dispensable product. The dispensable product can include a roll of sheet material, such as a roll of paper towels. In embodiments, the interior volume of the housing can be such at least two rolls of sheet material can be retained in the housing. In other embodiments, the dispensable product can include a liquid dispensable product, such as liquid soap or liquid hand sanitizes.

Example embodiments of the present disclosure are also directed to a dispenser for dispensing a dispensable product including a housing having an interior volume so as to retain a dispensable product, the housing including a front cover assembly and a dispensing mechanism contained within the housing for dispensing the dispensable product. The front cover assembly includes a front plate having a first side and a second and opposite side, the first side forming an exterior surface of the dispenser, the front plate having a front plate height (H1) and a front plate width (W1) and a label attached to the front plate via an in-mold process, wherein the label has a label height (H2) that is less than the front plate height (H1) and a label width (W2) that is less than the front plate width (W1) such that a border is formed around at least a portion of the label in the front plate. The front cover assembly also includes one or more side walls and a top wall molded to the front plate.

In embodiments, the front plate can be formed from a transparent material and the label is formed from an opaque material. A light emitting device can be disposed in the dispenser to emit light through the border. In certain embodiments, the border is different in appearance from the label.

In embodiments, the one or more sidewalls and top wall can be formed from a different material as compared to the front plate. While in other embodiments, the one or more sidewalls and top wall can be formed from the same material as compared to the front plate.

In addition to functionality, the front plate can also be designed for aesthetic appeal. For instance, the label attached to the front plate via an in-mold process can include one or more logos, patterns, or decorative finishes. Similarly, the border can be treated or modified to have a desired finished look. For example, the border can have a mirrored finish, a metallic finish, a woodgrain finish, a decorative pattern, or can be backlit with a light emitting device such that light can be emitted from the border.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to a method for forming a dispenser for dispensing a dispensable product. The method allows for flexibility in design offerings and functionality without requiring complicated manufacturing processes or time-consuming assembly. Furthermore, the dispensers provided herein can be easily customized or modified to meet the end-users functional and aesthetic preferences. For example, a user can select a front plate that has a particular desired look that can enable various functionalities, such as lighting and connectivity. Additionally, the methods provided allow for formation of a front cover assembly for a dispenser having little to no dirt traps, thus, allowing the dispenser to be more hygienic as compared to other multi-part dispensers.

In one embodiment, the dispenser includes at least a two-part housing having a front cover assembly and a back cover. The front cover assembly can be connected to the back cover for mounting the dispenser to a mounting surface, such as a wall. The front plate of the front cover assembly includes a front plate having a first side and a second opposite side and a label attached to the front plate via an in-mold process. The label has a label height (H2) and a label width (W2) that are both less than the front plate height (H1) and the front plate width (W1), such that a border is formed around at least a portion of the label in the front plate.

Figure 1:
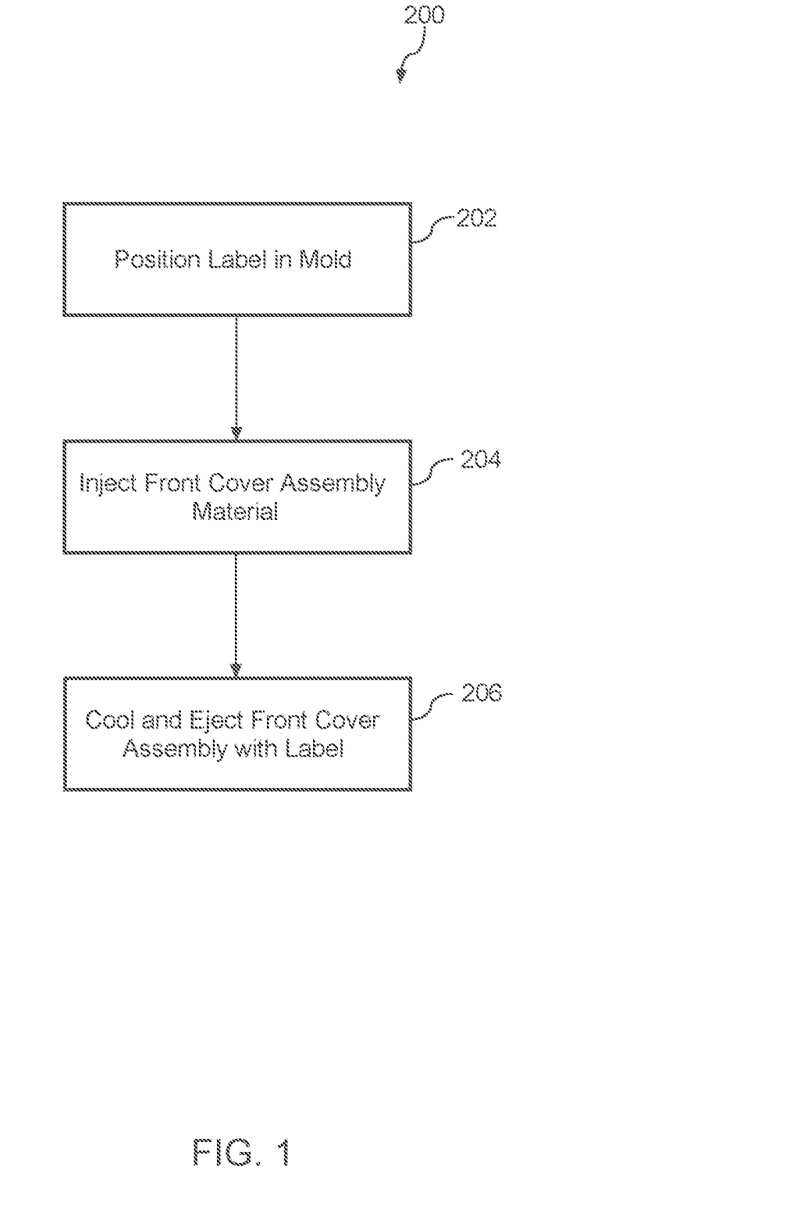
FIG. 1 illustrates a process flow diagram for forming a portion of a dispenser according to example embodiments of the present disclosure.

FIG. 1 shows an exemplary process (200) for forming a front cover assembly for a dispenser according to example embodiments of the present disclosure. At (202) the method includes the step of positioning the label in a mold. The label can be formed from any material suitable for use according to an in-mold production process. For example, in certain embodiments, the label can be formed from an opaque material, such as an opaque plastic or paper. The label can include any design element, such as a logo, company information, design, etc.

At (204) the material for forming the front cover assembly is heated and injected into the mold (204). The material may be heated to a temperature of between about 365° K. (200° F.) and about 560° K. (550° F.) before it is injected into the mold. During (204) the label and the heated material interact, whereby the label is incorporated into the heated material that forms the front cover assembly. The material that forms the front cover assembly can be any suitable thermoplastic material. The material used to form the front cover assembly can be a transparent plastic material. In other embodiments, the material used to form the front cover assembly can be treated with colorants, dyes, fillers, etc. in order to produce a front plate having a desired appearance and functionality. In certain embodiments, the front cover assembly is formed from a transparent material and the label is formed from an opaque material. Advantageously, the label is placed in the mold and material for forming the front cover assembly is injected into the mold such that the material for forming the front cover assembly including the front plate forms a border around at least a portion of the label. For example, the label can have a label height (H2) and a label width (W2) that are smaller than that front plate height (H1) and front plate width (W1) of the formed front plate.

Forming the front cover, side walls, top wall, and/or bottom wall from the same material can save manufacturing costs and time. Additionally, forming the front cover assembly according to process (200) allows for the production of a unitary front cover having no sink marks or warpage. Dirt traps are reduced or completely eliminated.

At (206) the front cover assembly is allowed to cool before being ejected from the mold.

Figure 2:
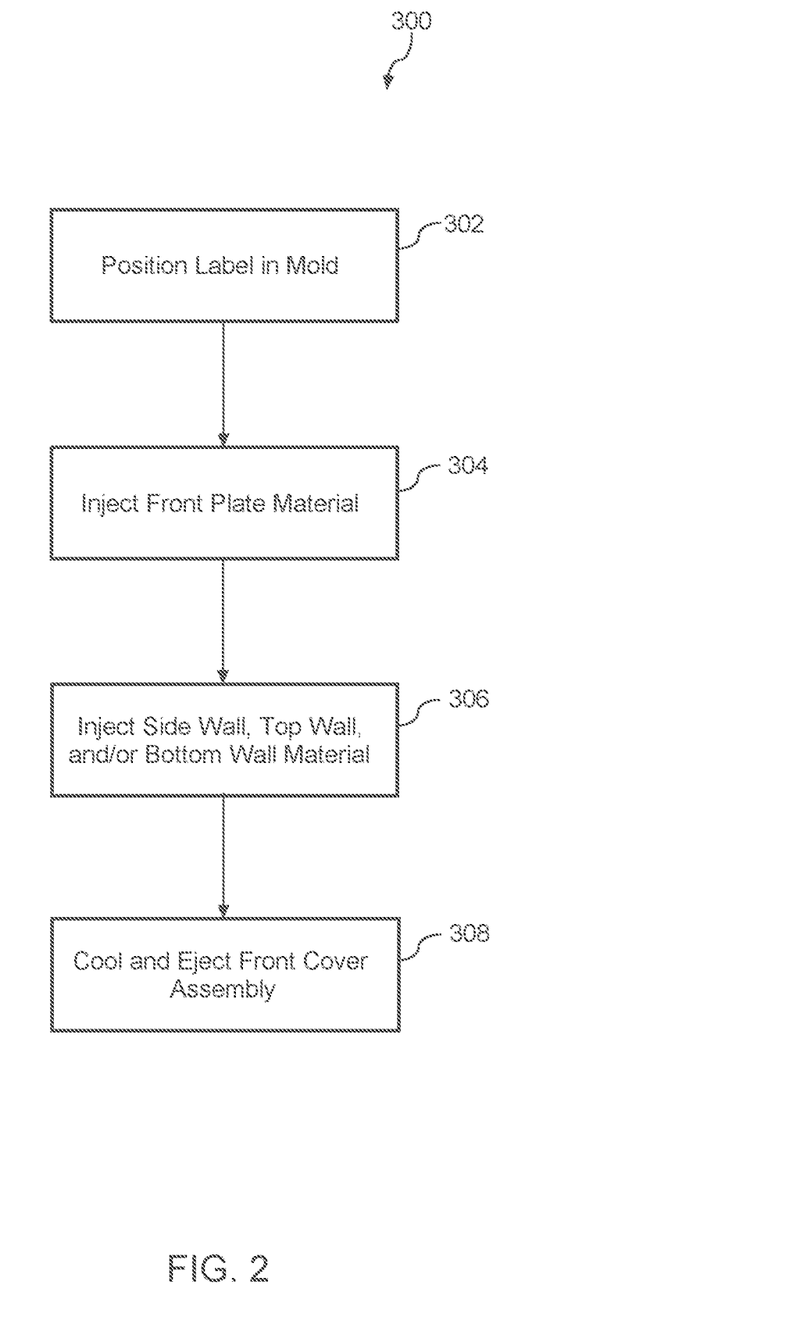
FIG. 2 illustrates a process flow diagram for forming a portion of a dispenser according to example embodiments of the present disclosure.

FIG. 2 shows an exemplary process (300) for forming a front cover assembly for a dispenser according to example embodiments of the present disclosure. At (302) the method includes the step of positioning the label in a mold. The label can be formed from any material suitable for use according to an in-mold production process. For example, in certain embodiments, the label can be formed from an opaque material, such as an opaque plastic or paper. The label can include any design element, such as a logo, company information, design, etc.

At (304) the material for forming the front plate is heated and injected into the mold. The material may be heated to a temperature of between about 365° K. (200° F.) and about 560° K. (550° F.) before it is injected into the mold. During (304) the label and the heated material interact, whereby the label is incorporated into the heated material that forms the front plate. The material that forms the front plate can be any suitable thermoplastic material. The material used to form the front plate can be a transparent plastic material. In other embodiments, the material used to form the front plate can be treated with colorants, dyes, fillers, etc. in order to produce a front plate having a desired appearance and functionality. In certain embodiments, the front plate is formed from a transparent material and the label is formed from an opaque material. Advantageously, the label is placed in the mold and material for forming the front plate is injected into the mold such that the material for forming the front plate forms a border around at least a portion of the label. For example, the label can have a label height (H2) and a label width (W2) that are smaller than that front plate height (H1) and front plate width (W1) of the formed front plate.

At (306) the material for forming the side walls, top wall, and/or bottom wall of the front cover assembly is heated and injected into the mold to form the front cover assembly. In such a method, different materials can be used to form the front plate versus the walls of the front cover assembly. For example, the sidewalls, top wall, and bottom wall can be formed from an opaque material, while the front plate is formed from a transparent material. Accordingly at (306) the method (300) allows for the formation of sidewalls, a top wall, and/or a bottom wall that may be visually distinct from the front plate material having the label therein, while allowing for the integral molding of the side walls, top wall, and/or bottom wall to the front plate such that dirt traps are reduced if not completely eliminated. Accordingly, front cover assemblies can be easily molded from different materials according to end user preferences, while remaining hygienic.

At (308) the front cover assembly is allowed to cool before being ejected from the mold.

Figure 3:
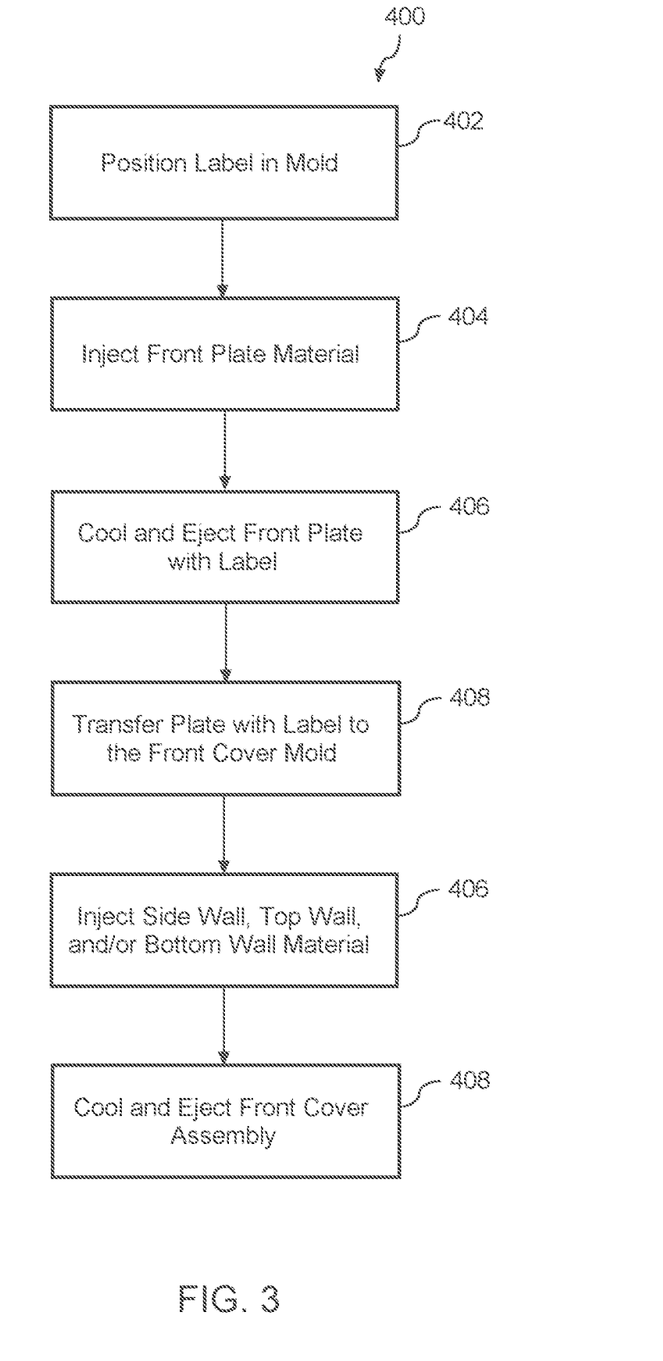
FIG. 3 illustrates a process flow diagram for forming a portion of a dispenser according to example embodiments of the present disclosure.
Figure 4:
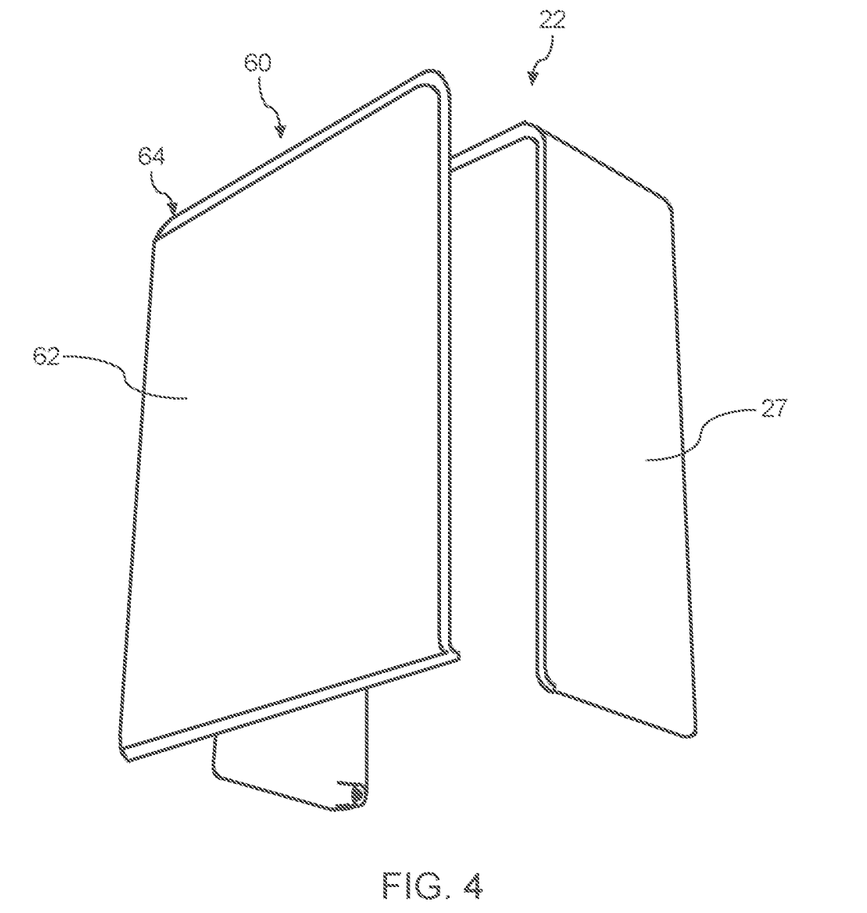
FIG. 4 illustrates an exploded view of a front cover assembly according to example embodiments of the present disclosure.
Figure 5:
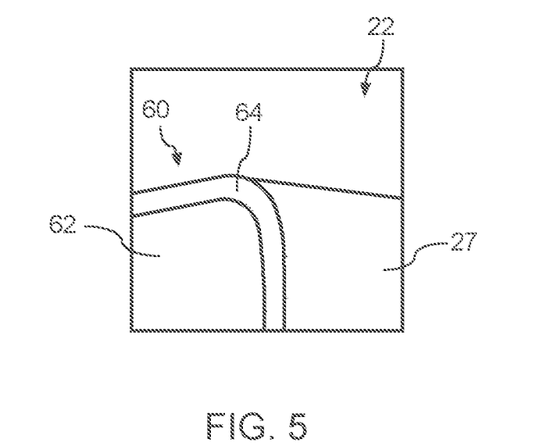
FIG. 5 illustrates a perspective view of a portion of a front cover assembly according to example embodiments of the present disclosure.

FIG. 3 shows an exemplary process (400) for forming a front cover assembly for a dispenser according to example embodiments of the present disclosure. At (402) the method includes the step of positioning the label in a mold. The label can be formed from any material suitable for use according to an in-mold production process. For example, in certain embodiments, the label can be formed from an opaque material, such as an opaque plastic or paper. The label can include any design element, such as a logo, company information, design, etc.

At (404) the material for forming the front plate is heated and injected into the mold. The material may be heated to a temperature of between about 365° K. (200° F.) and about 560° K. (550° F.) before it is injected into the mold. During (404) the label and the heated material interact, whereby the label is incorporated into the heated material that forms the front plate. The material that forms the front plate can be any suitable thermoplastic material. The material used to form the front plate can be a transparent plastic material. In other embodiments, the material used to form the front plate can be treated with colorants, dyes, fillers, etc. in order to produce a front plate having a desired appearance and functionality. In certain embodiments, the front plate is formed from a transparent material and the label is formed from an opaque material. Advantageously, the label is placed in the mold and material for forming the front plate is injected into the mold such that the material for forming the front plate forms a border around at least a portion of the label. For example, the label can have a label height (H2) and a label width (W2) that are smaller than that front plate height (H1) and front plate width (W1) of the formed front plate.

At (406) the front plate having the label therein is allowed to cool and then is ejected from the mold.

At (408) the front plate having the label molded therein is transferred to the front cover mold. For example, the front cover mold can be a separate mold in the same machine as the front plate mold. In embodiments, a robot can be used to transfer the front plate with label to the front cover mold. In other embodiments, it is contemplated that multiple front plates with labels can be premade and can later be brought to a front cover mold to complete manufacturing of the front cover assembly.

At (410) material for forming the side walls, top wall, and/or bottom walls of the front cover assembly is heated an injected into the front cover mold to form the front cover assembly. In such a method, different materials can be used to form the front plate versus the walls of the front cover assembly. For example, the sidewalls, top wall, and bottom wall can be formed from an opaque material, while the front plate is formed from a transparent material. Accordingly at (410) the method (400) allows for the formation of sidewalls, a top wall, and/or a bottom wall that may be visually distinct from the front plate material having the label therein, while allowing for the integral molding of the side walls, top wall, and/or bottom wall to the front plate such that dirt traps are reduced if not completely eliminated. Accordingly, front cover assemblies can be easily molded from different materials according to end user preferences, while remaining hygienic.

At (412) the front cover assembly is allowed to cool before being ejected from the mold.

The methods disclosed herein can further include attaching the front cover assembly to a back cover. The back cover can include a first side and a second an opposite side, the second and opposite side configured to be mounted to a mounting surface. A housing having an interior volume so as to retain the dispensable product is formed between the front cover assembly and the back cover. The method also includes disposing a dispensing mechanism within the housing of the dispenser for dispensing a dispensable product.

The dispensable product disposed in the housing can include a roll of sheet material, such as a roll of paper towels. The interior volume of the housing can be such that at least two rolls of sheet material can be disposed in the interior volume of the housing. In other embodiments, the dispensable product can include a liquid dispensable product, such as liquid soap or liquid hand sanitizes.

Figure 6:
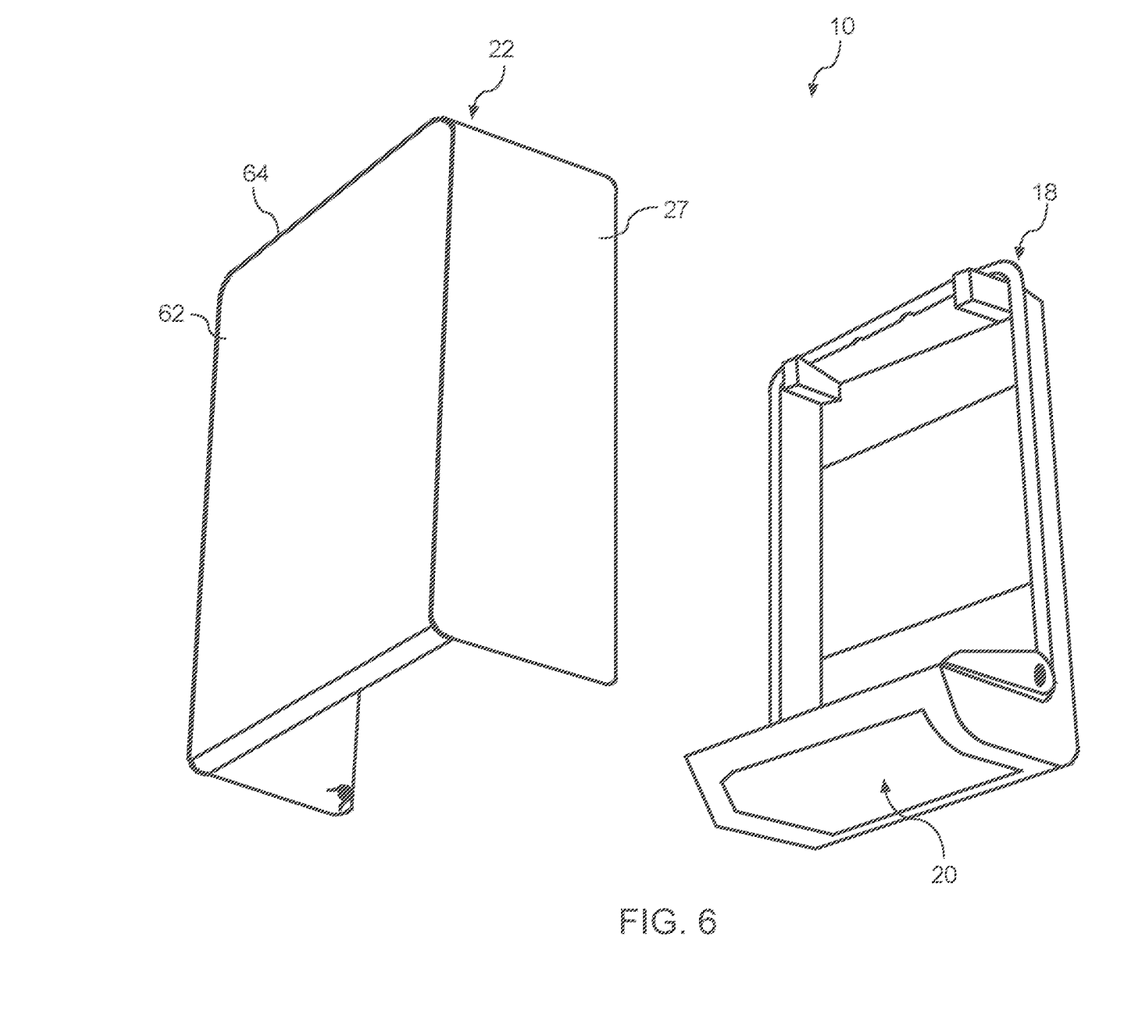
FIG. 6 illustrates an exploded view of a dispenser according to example embodiments of the present disclosure.
Figure 7:
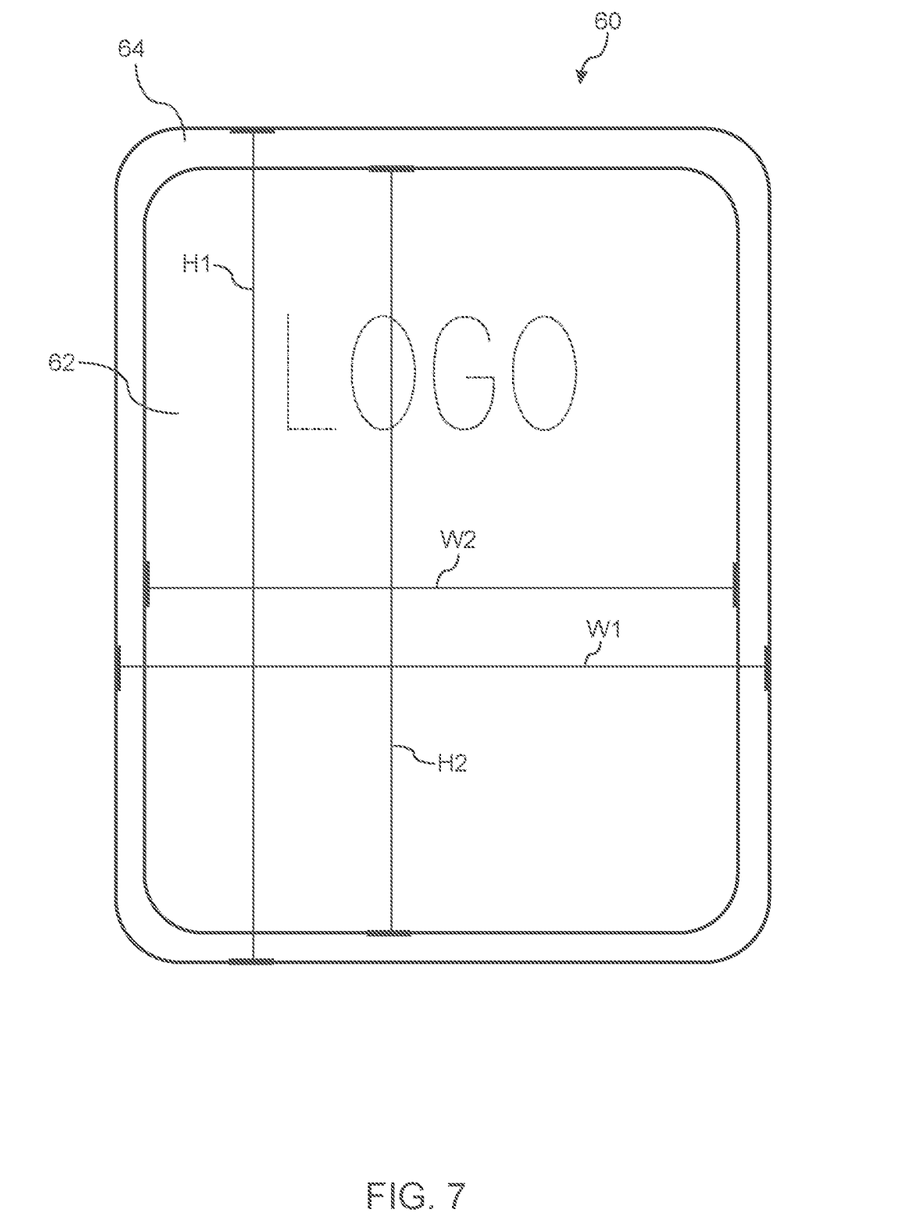
FIG. 7 illustrates a plan view of a front cover according to example embodiments of the present disclosure.
Figure 8:
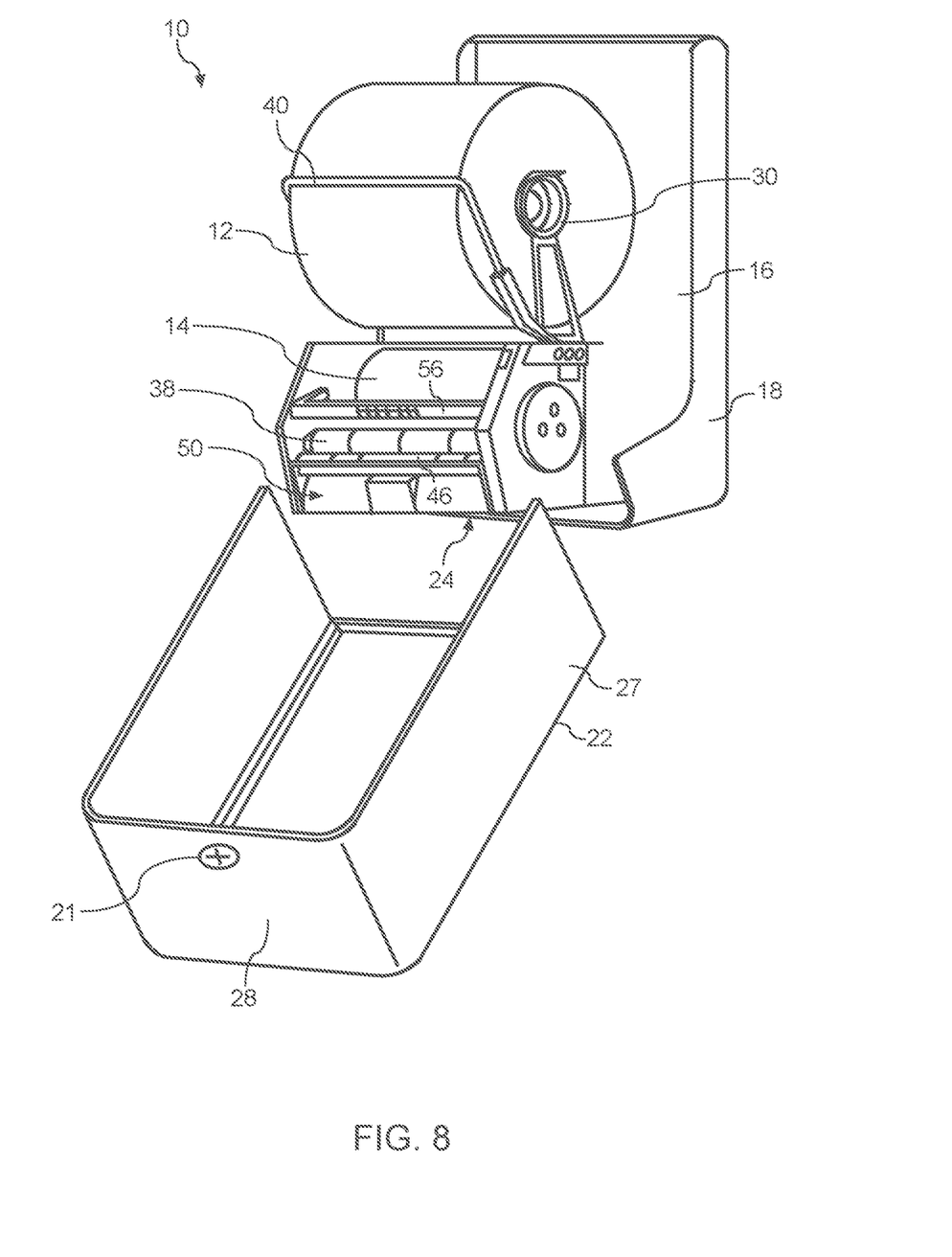
FIG. 8 illustrates a perspective view of a dispenser having the front cover assembly in an open position according to example embodiments of the present disclosure.
Figure 9:
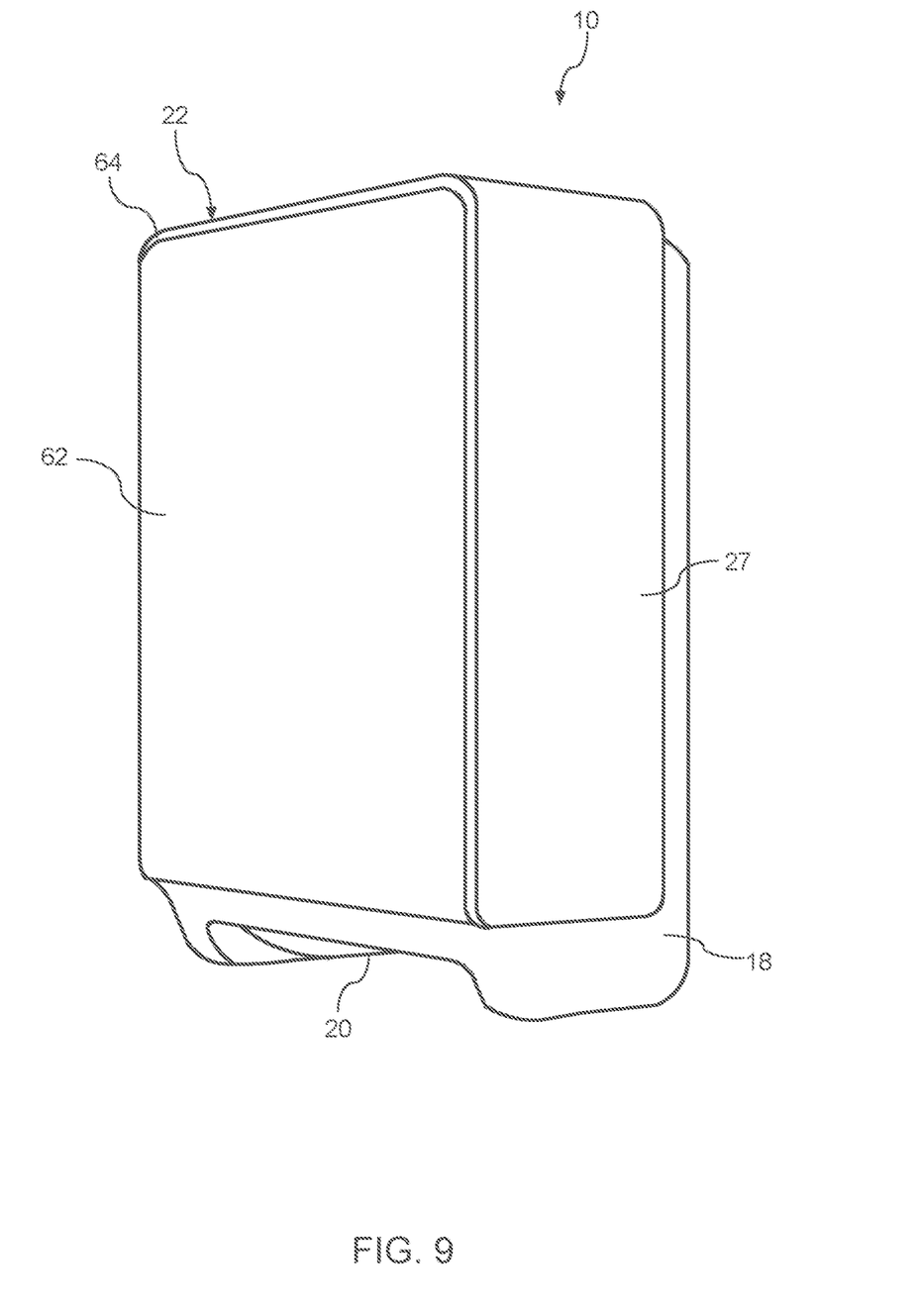
FIG. 9 illustrates a perspective view of a dispenser having the front cover assembly in a closed position according to example embodiments of the present disclosure.

Referring particularly to FIGS. 4-9, various embodiments of a dispenser 10 made according to the present disclosure are illustrated. The dispenser 10 includes a housing 16 that can have any desired overall shape. The housing 16 can include a two-part configuration. For example, the housing can include a back cover 18 and a front cover assembly 22. The front cover assembly 22 can be pivotally mounted to the back cover 18 using any suitable means. For example, in one embodiment, hinges can be used to connect the front cover assembly 22 with the back cover 18. Alternatively, the front cover 22 can be completely separable from the back cover 18. The front cover assembly 22 is moveable from a closed position as shown in FIG. 9 to an open position as shown in FIG. 8. The front cover assembly 22 includes a front plate 60 defining the outer facing portion of the front of the dispenser 10. In the embodiments illustrated, the front cover assembly 22 also defines the side walls 27 of the dispenser 10. However, in other embodiments, it is contemplated that the back cover 18 could form at least a portion or the entirety of the side walls 27 of the dispenser 10. In other embodiments, however, the front cover assembly 22 may have side walls that cooperate with the side walls of the back cover 18. The housing 16 defines an interior volume for housing the operational components of the dispenser 10, as well as the dispensable product to be dispensed. For example, in embodiments where the dispensable product includes a roll of sheet material, as shown in FIG. 8, the interior volume can house a main roll 12 and a stub roll 14. The dispenser 10 can also include any conventional locking mechanism 21 for securing the front cover assembly 22 to the back cover 18. The housing 16 further includes an opening 20 through which a dispensable product is dispensed.

In accordance with the present disclosure, the front cover assembly 22 of the dispenser 10 includes a front plate 60, as shown in FIG. 4-7. More particularly, the front cover assembly 22 includes a front plate 60 having a label 62 attached to the front plate 60 via an in-mold process. As shown in FIG. 7, the front plate 60 has a front plate height (H1) and a front plate width (W1) while the label 62 has a label height (H2) and a label width (W2). In embodiments, the label height (H2) is less than or smaller than the front plate height (H1) and the label width (W2) is less than or smaller than the front plate width (W1), such that a border 64 is formed around at least a portion of the label 62. In other embodiments, not shown, it is contemplated that the label 62 can be positioned such that the border is not formed along all sides of the label, as is shown in FIG. 7, and that the border may be formed around three sides of the label 62, two sides of the label 62, or one side of the label 62. In other embodiments, the label width (W2) and label height (H2) may generally be the same as the front cover width (W1) and front cover height (H1), such that substantially no border is formed.

The label 62 can be formed from any suitable material including plastic-based materials, paper-based materials, and combinations thereof. Furthermore, the label 62 can include textured films or metal films. The label 62 can be formed via any suitable polymeric material or layers of suitable polymeric materials. For example, the label can include polyethylene (e.g., HDPE, MDPE, LDPE, LLDPE), polypropylene (e.g. PP, OPP, BOPP), blends of PP and PE, polyvinyl chloride (PVC), polyethylene terephthalate (e.g., PET, EPET, PETG, OPET), polystyrene (e.g., PS, HIPS), and polyamide. Other suitable materials for forming the label 62 include synthetic paper, metal foil, polymers, and combinations thereof. Optionally, the outermost layer of the label 62, i.e. the portion of the label that contacts the front plate material, can include a material that is the same or similar to the front plate material to facilitate proper bonding of the label 62 to the front plate material.

Advantageously, the label 62 can be customized according to an end user's preference. For example, portions of the label may be removed such that light emitting devices from the interior of the dispenser 10 can shine through certain portions of the label 62. In such embodiments, portions of the label 62 and the border 64 can be backlit with matching light in order to create a certain aesthetic. In other embodiments, it is contemplated that certain portions of the label 62 and the border 64 can be backlit with different types or colors of lights in order to create the desired aesthetic.

Furthermore, the labels 62 provided can be customized according to an end-user's preference. Such customization of the label 62 itself, and not the entire front cover assembly, provides for a more customized front assembly cover 22 without substantially increasing manufacturing costs.

In certain embodiments, the front cover 60 having the label 62 therein can be integrally molded to one or more sidewalls 27 and a top wall 28 to form the front cover assembly 22, as shown in FIG. 6. In some embodiments, the front cover assembly 22 is a two-component assembly including a first component having one or more sidewalls 27 and a top wall 28 and a second component including the front cover 60 having the label 62 therein. The front cover 60 having the label 62 therein can be formed from the same material as the side walls 27 and the top wall 28, or it may be formed from a different material. For example, the front cover 60 having the label 62 therein can be formed from a transparent material while the side walls 27 and top wall 28 are formed from an opaque material. To assemble the front cover assembly 22, the side walls 27, top wall 28, and optionally, a bottom wall, can be molded on to the front cover 60.

The dispenser 10 configuration illustrated in the figures is merely exemplary for any number of dispenser configurations known to those skilled in the art that may incorporate the front cover assembly of the present disclosure. As such, a detailed explanation of the structural and control features of the dispenser 10 is not necessary for purposes of explanation of the system and method of the present disclosure, and will only be discussed briefly below.

The operational components of the dispenser 10 may be mounted directly to the back cover 18 or can be part of a module that is received within the housing 16. For example, the operational components can be part of a module that may be readily removable from the housing for servicing and/or replacing components without the necessity of having to remove the entire dispenser 10 from its support surface.

As shown in FIG. 8, the operational components can include a pressure roller 46, a transfer mechanism that may include a transfer arm 56, a throat assembly 50 that defines a throat 24, a drive motor and gear assembly that rotates a drive roller 38, and control circuitry which may include a controller or microprocessor.

Left and right main roll holders 30 are attached within the housing and hold the main roll 12 of sheet material. Stub roll holders may be provided for rotatably supporting the stub roll 14 in the position within the housing below the main roll 12. It should be understood that a dispenser according to the present disclosure need not be configured to dispense from a stub roll, and thus would not need a transfer mechanism. The dispenser may be configured for dispensing from a single roll of sheet material.

The pressure roller 46 may be housed within the throat assembly 50 that is, in turn, mounted within the housing. The dispenser 10 may also include a tear bar or cutting bar that is contained within the throat assembly 50 and disposed along the dispensing path of the sheet of material upstream from the dispensing opening 20 and downstream of the nip between the drive roller 38 and the pressure roller 46. To separate a sheet of material that has been dispensed from the dispenser 10, the cutting bar can automatically cut the material or, alternatively, a user can grasp a sheet hanging from beneath a bottom portion of the housing and pulls the sheet against the cutting or tear bar such that the sheet tears and separates along a line defined by the tear or cutting bar.

The pressure roller 46 is spring biased against the drive roller 38 such that the sheet of material passing between the nip of the rollers is advanced along the dispensing path upon rotation of the drive roller 38. The throat assembly 50 defines a portion of the dispensing path and the forward portion of the dispensing throat 24. The dispenser 10 may further include an automatic transfer mechanism to transfer dispensing of the sheet of material from the stub roll 14 to a main roll 12 when the sheet of material on the stub roll 14 is nearly depleted. Any suitable transfer mechanism may be used. For example, the transfer mechanism may include a transfer bar 56 with arms pivotally mounted. The transfer bar 56 includes a roller section that may be defined by a central curved rib section. The rib section includes a securing mechanism, such as a barb, so that the leading end of the sheet of material from the main roll 12 passes over the rib section and is held by the barb while material is fed from the stub roll 14. The dispenser 10 can also include a stub roll sensing device, such as a sensing bar that is biased towards the axis of the stub roll holders so as to track the decreasing diameter of the stub roll as it is depleted. Alternatively, an electronic sensor can also be used to monitor the stub roll.

The dispenser 10 can also include a spring biased bar 40 that is pivotally mounted within the housing 16 and biased towards the center of the main roll 12 such that tracks a decreasing diameter of the main roll 12 as the sheet of material is depleted. Again, instead of a spring biased bar 40, any suitable electronic sensor may also be used. When the main roll 12 reaches a diameter suitable for moving the roll to the stub roll position, the dispenser 10 can include suitable mechanical elements for moving the main roll 12 into place for dispensing the sheet of material.

The drive roller 38 can be placed in communication with a drive motor and gear assembly. The motor can include a drive shaft and a drive gear attached thereto that engages the shaft of the drive roller 38. Thus, upon energizing the motor, the drive roller 38 is caused to rotate, which results in conveyance of the sheet of material disposed in the nip between the pressure roller 36 and the drive roller 38 along the conveying path and out of the dispensing throat 24.

The dispensing mechanism may be powered by batteries contained in a battery compartment or can be powered by an AC distribution system. If the dispenser 10 includes batteries, a sensor can also be included for determining the power level of the batteries.

As described above, the dispenser 10 can include a controller and control circuitry. The controller and control circuitry can control and monitor all the functions of the dispenser 10 including the length of the sheet of material being dispensed, product usage, and any other activities that are occurring within the dispenser. The controller can be configured to communicate information regarding the dispenser 10 to a central control system via wired means or through a web-based system.

In one embodiment, the dispenser 10 can include a sensor that is designed to detect the presence of a user in a detection zone. Once the presence of a user is detected, the dispenser 10 can be configured to automatically dispense the sheet product.

In another embodiments, the dispenser can include one or more light emitting devices, such as a strip of light emitting diodes (LED) for illuminating portions of the front cover assembly of the dispenser 10.

In addition to mechanically connecting the front plate 60 to the front cover assembly 22, the dispenser 10 can also be configured so that the back cover 18 becomes electrically connected to a controller and a power supply within the dispenser 10 when attached to the back cover 18. For example, in one embodiment, the front cover assembly 22 can be connected to the back cover 18 such that an electrical connection in addition to a mechanical connection is created using appropriate wiring. In an alternative embodiment, the front plate assembly 22 can include electrical conduits that extend from a second side of the front cover assembly 22 through the back cover 18. (not shown). The one or more electrical conduits can receive appropriate wiring for making electrical connections.

In this regard, the front plate 60 can have electronic functionality. For instance, the front plate 60 may comprise an electronic display, capable of displaying graphics and images. In addition, the front plate 60 can be equipped with an audio speaker for emitting music, instructions, news, or any other information. In one embodiment, for instance, the front plate 60 can be connected to a controller for displaying television or cable channels, commercials, or any other media content.

Furthermore, the border 64 of the front plate can also have electric functionality. For instance, the border 64 can be illuminated via various light emitting devices or the overall appearance of the border 64 can be changed utilizing the electric connections within the front cover assembly 22.

In other embodiments, the front plate 60 may be designed to provide an overall look or appearance. For instance, the border 64 of the front plate can be configured to have a metallic finish or a mirrored finish. In other embodiments, the border 64 of the front plate 60 can have any desirable color, such as silver, black (onyx), or any color that may match the interior of the room in which the dispenser is located. The front plate 60 can also include trademarks and decorative designs. In embodiments, the border 64 can be further treated of modified to have a desired finished look. For example, the border can be modified to have a mirrored finish, a metallic finish, a wood grain finish, or a decorative pattern.

Advantages of the methods of manufacturing the dispensers disclosed herein and the dispensers themselves are numerous. For example, producing the front plate including an in mold label provides a more hygienic dispenser having reduced dirt traps. Furthermore, the number of parts to manufacture and assemble are reduced, thereby creating manufacturing efficiencies while reducing manufacturing costs. Furthermore, the dispensers disclosed herein allow for the end user to more easily incorporate certain design aesthetics or functionality in the dispensers provided herein. For example, an end user can select the front cover assembly to be installed and displayed for a particular purpose or period of time. The end user can also switch out the different front plate assemblies as desired.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A method of forming a front cover assembly for a dispenser for dispensing a dispensable product, comprising:
   positioning a label in a mold, the label having a label height (H2) and label width (W2);
   injecting a first material into the mold to form a front plate, the front plate having a front plate height (H1) that is greater than the label height (H2) and a front plate width (W1) that is greater than the label width (W2) such that a border is formed around at least a portion of the label in the front plate, wherein the front plate is formed from a transparent material and the label is formed from an opaque material; and injecting a second material into the mold to form one or more sidewalls, a top wall, a bottom wall, or combinations thereof of the front cover assembly.

2. The method of claim 1, wherein the label further includes one or more logos positioned thereon.

3. The method of claim 1, further comprising disposing one or more light emitting devices in the dispenser to light the border.

4. The method of claim 1, further comprising modifying the border to change the appearance of the border.

5. The method of claim 1, wherein the first material is different from the second material.

6. The method of claim 1, wherein the first material is the same as the second material.

7. The method of claim 1, further comprising attaching the front cover assembly to a back cover, the back cover comprising a first side and a second and opposite side, the second and opposite side configured to be mounted to a mounting surface, wherein a housing having an interior volume so at to retain a dispensable product is formed between the front cover assembly and the back cover.

8. The method of claim 7, further comprising disposing a dispensing mechanism within the housing for dispensing the dispensable product.

9. The method of claim 1, wherein the dispensable product comprises a roll of sheet material.

10. The method of claim 9, wherein the roll of sheet material comprises a roll of paper towels for dispensing paper towels from the dispenser.

11. The method of claim 7, wherein the interior volume of the housing has a volume so as to retain at least two rolls of sheet material.

12. The method of claim 1, wherein the dispensable product comprises a liquid dispensable product.

13. A method of forming a front cover assembly for a dispenser for dispensing a dispensable product, comprising:

positioning a label in a first mold, the label having a label height (H2) and label length (L2);

injecting a first material into the first mold to form a front plate with in-mold label, the front plate having a front plate height (H1) that is greater than the label height (H2) and a front plate width (W1) that is greater than the label width (W2) such that a border is formed around at least a portion of the label in the front plate, wherein the front plate is formed from a transparent material and the label is formed from an opaque material;

cooling the front plate with in-mold label;

ejecting the front plate with in-mold label from the first mold;

transferring the front plate with in-mold label to a second mold;

injecting a second material into the second mold to form one or more sidewalls, a top wall, a bottom wall, or combinations thereof of the front cover assembly.

14. A dispenser for dispensing a dispensable product, comprising:

a housing having an interior volume so as to retain a dispensable product, the housing including a front cover assembly; and a dispensing mechanism contained within the housing for dispensing the dispensable product;

wherein the front cover assembly comprises:

(1) a front plate having a first side and a second and opposite side, the first side forming an exterior surface of the dispenser, the front plate having a front plate height (H1) and a front plate width (W1);

(2) a label attached to the front plate via an in-mold process, wherein the label has a label height (H2) that is less than the front plate height (H1) and a label width (W2) that is less than the front plate width (W1) such that a border is formed around at least a portion of the label in the front plate, wherein the front plate is formed from a transparent material and the label is formed from an opaque material; and (3) one or more sidewalls and a top wall molded to the front plate.

15. The dispenser of claim 14, further comprising a light emitting device disposed in the dispenser to emit light through the border.

16. The dispenser of claim 14, wherein the border is different in appearance from the label.

17. The dispenser of claim 14, wherein the one or more sidewalls and top wall are formed from a different material as compared to the front plate.

18. The dispenser of claim 14, wherein the one or more sidewalls and top wall are formed from the same material as the front plate.

* * * * *